March 25, 1958     O. KAMMER     2,828,112
FEED MIXER

Filed March 26, 1956     2 Sheets-Sheet 1

*INVENTOR.*
OSWIN KAMMER

BY

ATTORNEY

March 25, 1958　　　　O. KAMMER　　　　2,828,112
FEED MIXER

Filed March 26, 1956　　　　　　　　2 Sheets-Sheet 2

*INVENTOR.*
OSWIN KAMMER
BY
ATTORNEY of United States Patent Office 2,828,112
Patented Mar. 25, 1958

2,828,112
FEED MIXER
Oswin Kammer, Davenport, Iowa
Application March 26, 1956, Serial No. 573,957
15 Claims. (Cl. 259—46)

This invention relates to a machine for mixing fluent material, especially feed for animals, and has for a principal object the provision of an improved machine, preferably portable and mobile, that combines mixing and feeding functions to the end that animals in pens, stalls, etc. may be conveniently fed with properly mixed feed.

The machine is particularly well adapted to the gruel feeding of hogs, for example, in which ground feed of any one of several varieties, or ground feed of different types, may be readily mixed with liquid such as water, buttermilk and the like, which mixed material is handled by a machine that serves not only to mix and feed the material but also to transport the material to useful locations. To this end the machine embodies a container or tank in which the different substances and liquids are delivered or loaded, plus a mixing auger having helical sections of opposite hands, one of which serve as an output "pump" and the other of which affords an agitating action on portions of the material in the container. It is also an important object to utilize reversible driving mechanism for the auger to reverse its direction of rotation not only to create a different type of agitating action but also to exploit the "pump" section of the auger as an intake means whereby liquid may be drawn into the container by the normal discharge conduit. The invention features a simple and economical mobile frame which may be easily drawn by a tractor or like vehicle having a power take-off by means of which the auger may be driven through a forward-reverse transmission gear set. Another object of the invention is to provide means for applying heat to the container to keep the contents from freezing during use in low-temperature conditions. Other objects and features inherent in and encompassed by the invention will become apparent as a preferred embodiment of the invention is disclosed, by way of example, in the ensuing specification and accompanying drawings, the several figures of which are described below.

Figure 1:
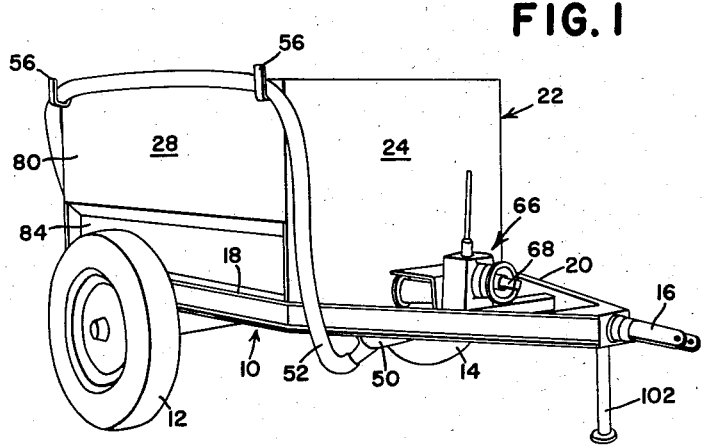
Figure 2:
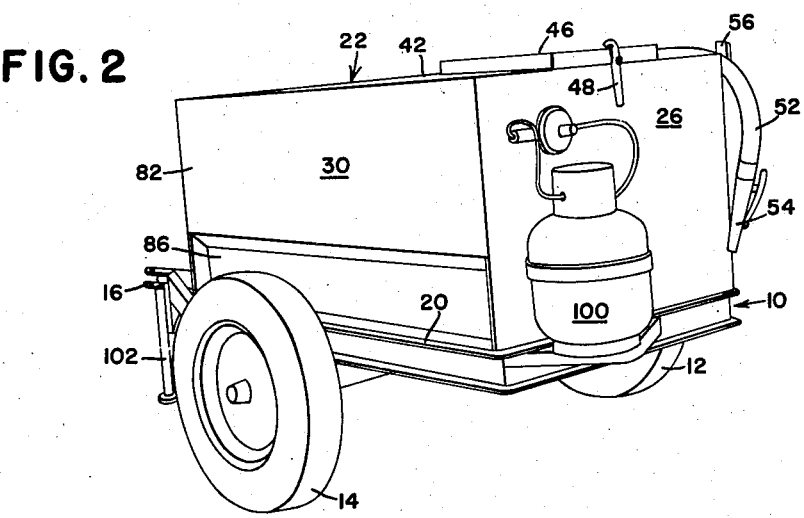
Figure 6:
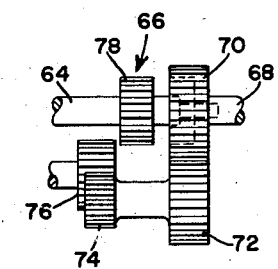
Figure 3:
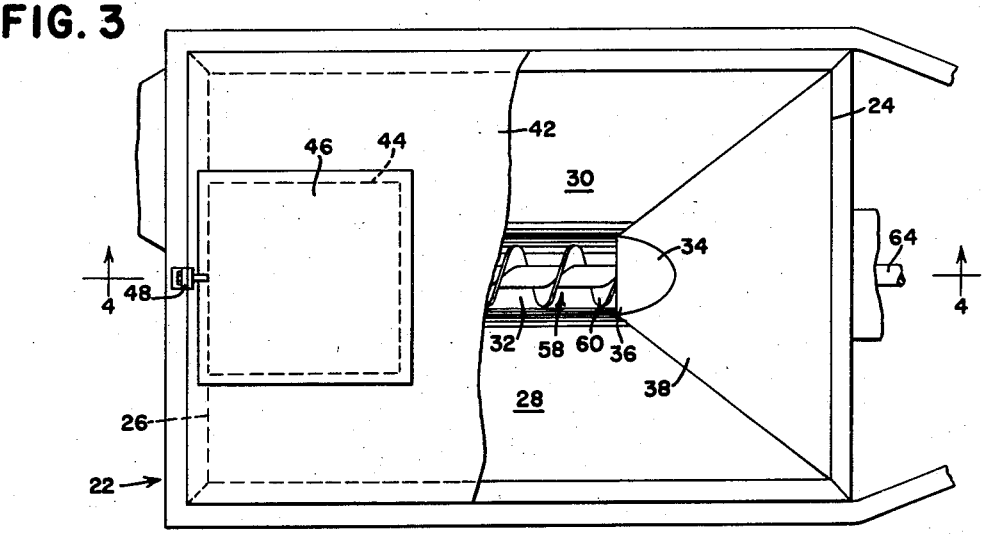
Figure 4:
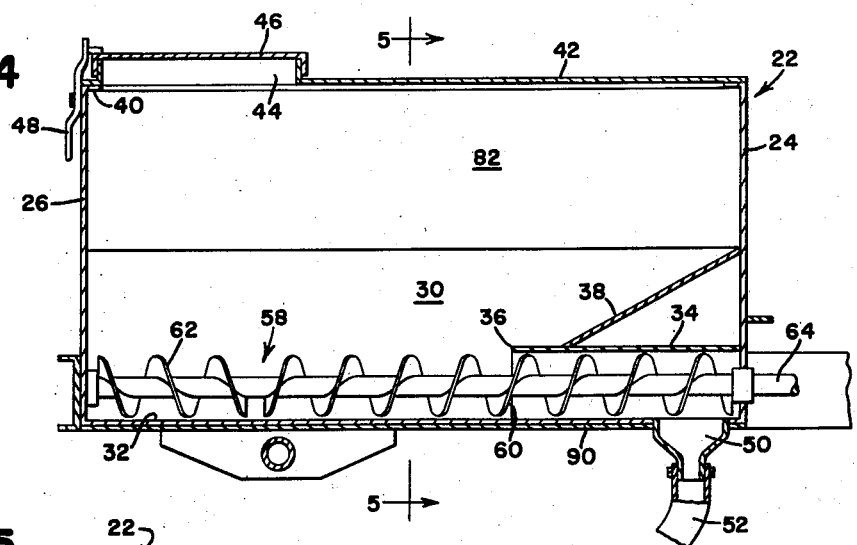
Figure 5:
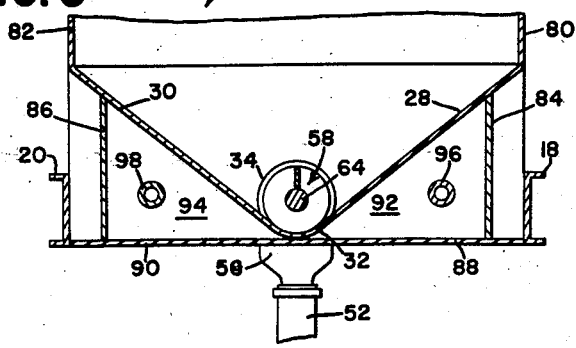

Figure 1 is a right front perspective of the machine.
Figure 2 is a left rear perspective of the machine.
Figure 3 is a fragmentary plan view of the machine with a portion of the top removed.
Figure 4 is a longitudinal section on the line 4—4 of Figure 3.
Figure 5 is a transverse section on the line 5—5 of Figure 4.
Figure 6 shows a representative forward-reverse transmission.

The machine chosen for the purposes of illustration comprises a mobile main frame 10 carried on right and left wheels 12 and 14 and including a forward hitch or drawbar 16 for connection to a draft vehicle, such as a tractor (not shown). The frame has right and left side members 18 and 20 between which and other frame members not significant here a container 22 is supported. This container has front and rear walls 24 and 26, respectively, and right and left fore-and-aft side walls 28 and 30 which slope laterally inwardly and downwardly to afford a fore-and-aft bottom trough 32. An auger tube 34 is coaxial with the trough and extends rearwardly from the front wall 24 to a terminal rear end 36 short of the rear wall 26; in a preferred construction, the length of the tube 34 is approximately one-third of the distance between the front and rear walls; although, this proportion can be varied. A front baffle 38 is disposed across the forward portions of the side walls 28 and 30 and slopes downwardly and rearwardly to a suitable junction with the rear end 36 of the tube, the purpose of the baffle being to influence the material toward the trough 32 for entrance into the rear end of the tube as will appear below. The baffle is preferably welded in place, as is the tube, which method of securement is used throughout the construction in the interests of strength and economy. The marginal upper edges of the walls 24, 26, 28 and 30 are peripherally flanged at 40 to support a container top or ceiling 42 which has at its rear portion a feed or loading opening 44 normally closed by a removable cover 46 suitably releasably latched as at 48. The location of the feed opening 44 at the rear places it away from moving parts, such as the drive mechanism to be presently described. Since the top is closed except for the opening 44, there is virtually no danger of an operator being injured by internal working parts.

The rear wall 26 is generally upright, but the sloping front baffle 38 and inwardly sloping side walls 28 and 30 causes the material in the container to naturally gravitate to the trough 32, whence the material is not only fed outwardly through a forward discharge outlet 50 at the front of the tube 34 but is mixed and agitated in the meantime. As stated above, the material may be a suitable type or types of ground animal feed mixed with liquid such as water, milk, buttermilk and other well known ingredients. The outlet 50 is suitably connected to a flexible discharge conduit such as a hose 52 having any conventional type of valved nozzle 54. The hose when not in use is conveniently carried by side hangers 56.

A combination agitating and feeding auger 58 is disposed coaxially in the trough 32 and tube 34 and has front and rear helical sections 60 and 62, respectively, of opposite hand. The auger includes a central auger shaft which projects forwardly at 64 for connection to forward-reverse driving mechanism 66, which is here shown as a forward-reverse gear set (Figure 6) having an input shaft 68 connectible to the power take-off (not shown) of the drawing tractor. The shaft 68 has an internal-external gear 70 keyed thereto, the external portion of which is in constant mesh with a countershaft gear 72 which rotates in unison with a second coaxial countershaft gear 74. The gear 74 is in constant mesh with a reverse idler 76. A sliding gear 78 is splined to the forward end of the auger shaft 66 for selective mesh with either the internal part of the gear 70 or the reverse idler 76. The former produces forward drive of the auger (clockwise as seen in Figure 1) and the latter produces reverse drive (counterclockwise as seen in Figure 1).

During forward drive, the front section 60 of the auger, which exceeds the length of the tube 34 so as to extend rearwardly beyond the terminal rear end 36 of the tube and hence into the trough, feeds or pumps material forwardly through the tube and out through the outlet 50 to the hose 52. The rear section 62 of the auger at this time moves portions of the material back against the rear wall 26 of the container, whereby the material sloshes around and partakes of a mixing or agitating action. In view of the rearward extent of the auger section 60 beyond the rear end of the tube, the section is capacitated at all times during forward drive of the auger to incur feeding into the tube regardless of the tendency of the rear auger section 62 to drive portions of the material rearwardly. The front auger section 60 fits the tube relatively closely to improve the pumping or feeding action. Hence, the combination of the sloping side walls 28 and 30 and sloping baffle 38 with the auger as described affords an efficient duality of action; namely, feeding while mixing.

When the transmission or driving mechanism is shifted to reverse drive, the front section tends to propel material rearwardly and the rear section drives the material forwardly, the oppositely driven portions of the material meeting substantially centrally of the container to surge upwardly and outwardly, thus supplementing the mixing action obtained during forward drive. A further function of the front auger section during reverse drive is that of an intake pump, which is achieved by immersing the opened nozzle of the hose 52 into a container of liquid such as water, whereby the auger will pump this liquid into the container 22. In normal use, after the container has been filled as desired with material, the hose will be supported or carried as in Figures 1 and 2, with its nozzle closed, and during transport of the machine to the place or places of use, the transmission will be shifted into reverse so as to obtain the aforesaid mixing action en route. When the feeding situs is reached, the transmission will be shifted to forward and the hose used to distribute the material at will, during which time the first-mentioned mixing action will be attained. When the container or tank is emptied, it may be washed with water or detergent by simply adding the water, etc. and using the auger and driving mechanism to rinse and ultimately empty the container.

As best seen in Figures 1, 2 and 5, the side walls 28 and 30 respectively have upright extensions 80 and 82, which are offset at the junction with the sloping portions; and side sheets 84 and 86 respectively depend from the junctions and join laterally outwardly bottom sheet portions 80 and 90, thus affording at opposite sides of the body fore-and-aft heating chambers 92 and 94, the end walls 24 and 26 having sufficient transverse extent to close these chambers at front and rear, as will be apparent from Figures 1 and 2. These chambers respectively house or enclose heaters or burner tubes 96 and 98, which run parallel to the side walls 28 and 30 and which are suitably supplied with fuel from a fuel tank 100 carried at the rear of the machine (Figure 2). The type of heating system may be varied according to the fuel supply conditions in the particular area and that shown is merely representative. The details may be varied without sacrificing any of the benefits of the invention. The outer or exterior surfaces of the side walls 28 and 30 afford the respective upper parts of the chambers and adequately protect the contents of the container or tank 22 from freezing during low-temperature operation.

The hitch 16 may be provided with a stand 102 to support the machine when not connected to a tractor or the like.

Features and advantages of the invention include the provision of the walls 28 and 30 and the trough 32 which define a rear bottom part in the container in which material accumulates by gravity and from which the front section of the auger operates as a conveyor to remove material to the outlet 50, the rear section of the auger serving as agitating means driven by the conveyor section of the auger and operative to agitate material in the rear part of the container. In this respect, it should be understood that such expressions as "front," "rear," etc., used here and in the appended claims, are intended as terms of convenience and not of limitation. Other inventive features and objects that have not been categorically enumerated herein will undoubtedly occur to those versed in the art, as will many modifications of the preferred embodiment disclosed, all of which may be achieved without departure from the spirit and scope of the invention.

What is claimed is:

1. A mobile mixer for fluent feed material or the like, comprising: a fore-and-aft wheeled frame having forward hitch means for connection to a tractor having a power take-off; a material container on the frame and having front and rear end walls and fore-and-aft side walls, said side walls sloping laterally inwardly and downwardly to define a fore-and-aft auger trough extending forwardly from the rear end wall; an auger tube coaxial with the trough and extending rearwardly from the front wall to a rear terminal end short of the rear wall and in axial communication with the trough, said tube having a material outlet therein adjacent to its front end; an auger coaxially disposed in the trough and tube and including an auger shaft extending through the front wall, said auger further including a helical front section of greater length than the tube so as to extend throughout the tube and to project also a substantial distance beyond the rear end of the tube and short of the rear wall of the container, said auger having a coaxial rear helical section extending from the rear wall to and substantially meeting the rear end of the front section and being of opposite hand as respects said front section, said sections occupying a major portion of the fore-and-aft distance between the front and rear walls; and drive mechanism carried by the frame and connected to the auger shaft and adapted for driving connection to the power take-off of the tractor to rotate the auger in such direction that the front section feeds material forwardly to the material outlet while the rear section moves portions of the material rearwardly against the rear wall to afford a material-agitating action.

2. The invention defined in claim 1, in which: the drive mechanism includes selectively operative forward-reverse means for driving the auger in either the aforesaid direction or a reverse direction whereby said sections move material portions toward the center of the container to afford a further material-agitating action.

3. The invention defined in claim 1, including: means at each side wall of the container forming a heating chamber including the exterior surface of said side wall; heater means in each chamber; and a fuel container supported on the mixer and connected to and for supplying fuel to the heater means.

4. The invention defined in claim 3, in which: the main frame includes opposite fore-and-aft side members spaced laterally outwardly from the trough; the chamber forming means at each side of the container includes the aforesaid exterior surface of the side wall, a bottom sheet extending outwardly from the trough toward the respective side frame member, and a side sheet extending vertically between said bottom sheet and an upper portion of the respective sloping side wall to give said chamber a triangular section and said chambers extending upwardly beyond the level of the auger; the end walls extend laterally and join the respective side and bottom sheets to close the chamber at its opposite ends; and the respective heater means is housed in the chamber.

5. The invention defined in claim 1, in which: the front wall is generally upright; and a baffle extends across between the side walls and slopes rearwardly and downwardly from said front wall to the rear end of the auger tube.

6. The invention defined in claim 1, including: a flexible discharge conduit connected to the discharge outlet for conveying material remotely from the container.

7. The invention defined in claim 6, in which: the front auger section closely fits the tube to afford a material-pumping effect as respects the discharge outlet; and the drive mechanism is selectively reversible to reverse said pumping effect so as to draw material into the container via said conduit and outlet.

8. A mixer for fluent feed material or the like, comprising: a material container having front and rear end walls and fore-and-aft side walls, said side walls sloping laterally inwardly and downwardly to define a fore-and-aft auger trough extending forwardly from the rear end wall; an auger tube coaxial with the trough and extending rearwardly from the front wall to a rear terminal end short of the rear wall and in axial communication with the trough, said tube having a material outlet therein adjacent to its front end; an auger coaxially disposed in the trough and tube and including an auger shaft extending through the front wall, said auger further including a helical front section of greater length than the tube so as to extend throughout the tube and to project also a substantial distance beyond the rear end of the tube and short of the rear wall of the container, said auger having a coaxial rear helical section extending from the rear wall to and substantially meeting the rear end of the front section and being of opposite hand as respects said front section, said sections occupying a major portion of the fore-and-aft distance between said front and rear walls; and drive mechanism connected to the auger shaft to rotate the auger in such direction that the front section feeds material forwardly to the material outlet while the rear section moves portions of the material rearwardly against the rear wall to afford a material-agitating action.

9. The invention defined in claim 8, in which: the drive mechanism includes selectively operative forward-reverse means for driving the auger in either the aforesaid direction or a reverse direction whereby said sections move material portions toward the center of the container to afford a further material-agitating action.

10. The invention defined in claim 8, including: a flexible discharge conduit connected to the discharge outlet for conveying material remotely from the container.

11. The invention defined in claim 10, in which: the front auger section closely fits the tube to afford a material-pumping effect as respects the discharge outlet; and the drive mechanism is selectively reversible to reverse said pumping effect so as to draw material into the container via said conduit and outlet.

12. A mixer for fluent feed material or the like, comprising: a material container having front and rear ends, a bottom and a plurality of walls, certain of the walls sloping inwardly and downwardly to define a rear bottom part in which material accumulates; a fore-and-aft auger tube having a rear end opening to said rear bottom part and extending forwardly to an outlet; feed and agitating mechanism in the container, including a feed auger coaxially contained in the auger tube and projecting a substantial distance into said rear bottom part to a terminal rear end and agitating means in said rear bottom part and extending rearwardly from said terminal rear end and drivingly connected to the auger; and drive mechanism connected to and for driving the auger normally in a feeding direction from rear to front for simultaneously driving the agitating means via the auger.

13. The invention defined in claim 12, in which: the drive mechanism is selectively reversible for reversing the direction of the auger.

14. A mixer for fluent feed material or the like, comprising: a material container having front and rear ends, a bottom and a plurality of walls, certain of the walls sloping inwardly and downwardly to define a rear bottom part in which material accumulates; a fore-and-aft conveyor tube having a rear end opening to said rear bottom part and extending forwardly to an outlet; conveyor and agitating mechanism in the container, including a conveyor contained in the tube and projecting a substantial distance into said rear bottom part to a terminal rear end portion and agitating means in said rear bottom part and extending rearwardly from said terminal rear end portion and drivingly connected to the conveyor; and drive mechanism connected to and for driving the conveyor normally in a feeding direction from rear to front for simultaneously driving the agitating means via the conveyor.

15. The invention defined in claim 14, in which: the drive mechanism is selectively reversible for reversing the direction of the conveyor.

References Cited in the file of this patent

UNITED STATES PATENTS

| | | |
|---|---|---|
| 405,499 | Peabody | June 18, 1889 |
| 1,492,061 | Averill | Apr. 29, 1924 |
| 1,753,716 | Owen | Apr. 8, 1930 |
| 1,867,838 | Jaeger | July 19, 1932 |
| 2,225,215 | Guthrie | Dec. 17, 1940 |
| 2,552,763 | Baumann | May 15, 1951 |